United States Patent [19]
Reese

[11] 3,722,920
[45] Mar. 27, 1973

[54] HYDRAULIC STABILIZING DEVICE
[75] Inventor: Terrell J. Reese, Elkhart, Ind.
[73] Assignee: Reese Products, Inc., Elkhart, Ind.
[22] Filed: Feb. 12, 1971
[21] Appl. No.: 115,039

Related U.S. Application Data
[62] Division of Ser. No. 861,972, Sept. 29, 1969, abandoned.

[52] U.S. Cl.............280/446 B, 188/269, 188/288, 188/318, 188/134
[51] Int. Cl. ............................................B62d 53/00
[58] Field of Search...280/446 B, 446 R, 406 A, 457; 188/269, 318, 297, 266, 288

[56] References Cited

UNITED STATES PATENTS

| | | | |
|---|---|---|---|
| 1,480,170 | 1/1924 | Logan | 188/318 |
| 2,410,176 | 10/1946 | Magrum | 188/269 |
| 2,699,956 | 1/1955 | Mattson | 280/457 |
| 2,781,869 | 2/1957 | Boehm et al. | 188/269 |
| 3,284,098 | 11/1966 | Worley | 280/406 A |

*Primary Examiner*—Leo Friaglia
*Attorney*—Oltsch & Knoblock

[57] ABSTRACT

A hydraulic stabilizing device usable as a sway control for trailers or towed vehicles and including a hydraulic cylinder-piston unit having a normal position wherein the piston is located intermediate the length of the cylinder and being characterized by negligible resistance to piston movement in one direction from normal position and greater resistance to piston movement in the other direction from normal position. The piston has apertures and associated spring closures regulating liquid flow therethrough and the cylinder has piston by-pass means at one end portion thereof. The cylinder contains a sealed flexible hollow gas-containing chamber adapted to expand and contract to maintain the volume of the liquid-containing portion of the cylinder substantially constant during elongation and shortening of the unit.

5 Claims, 7 Drawing Figures

Patented March 27, 1973  3,722,920
2 Sheets-Sheet 1
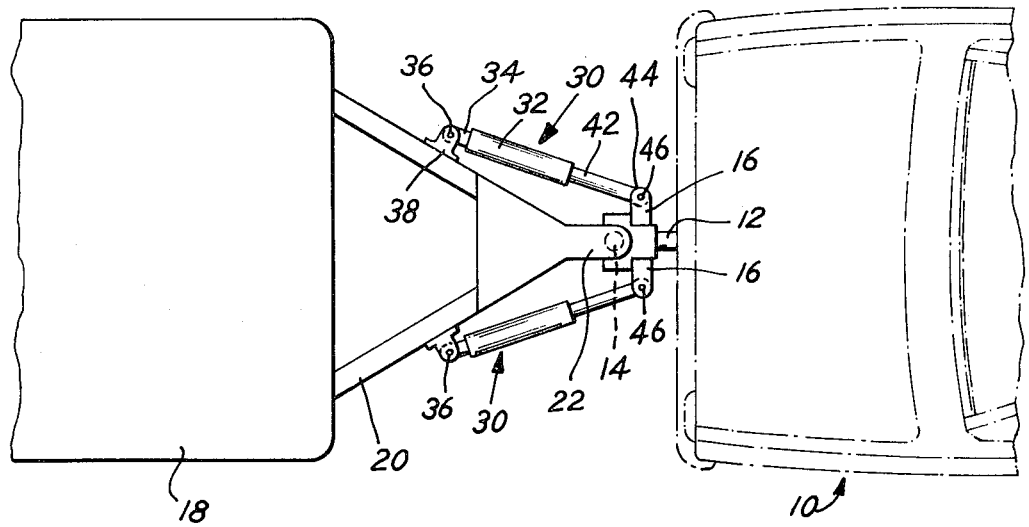
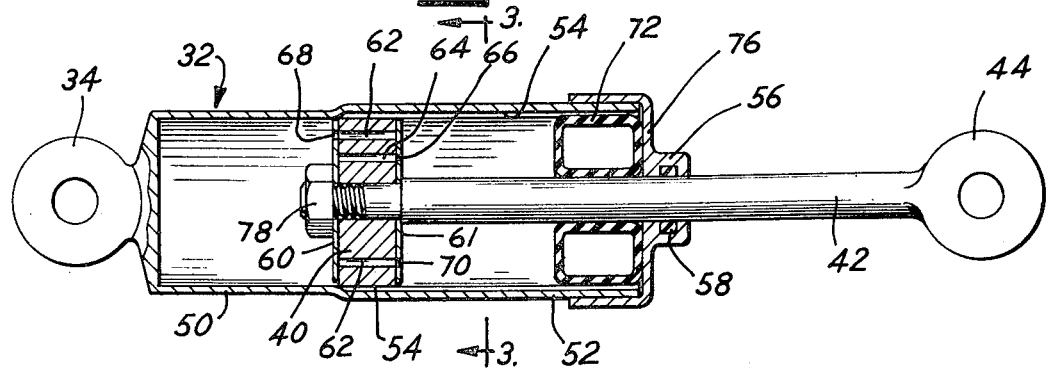
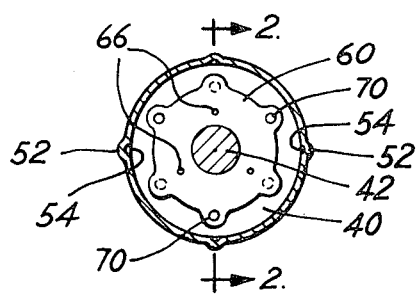

Patented March 27, 1973 3,722,920
2 Sheets-Sheet 2
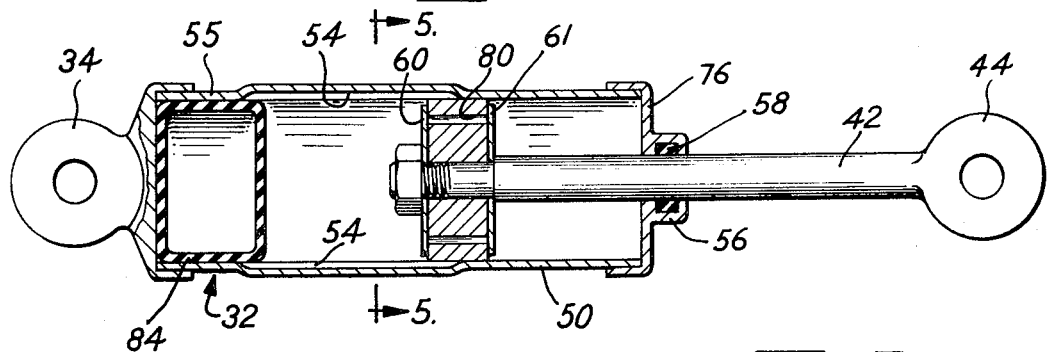
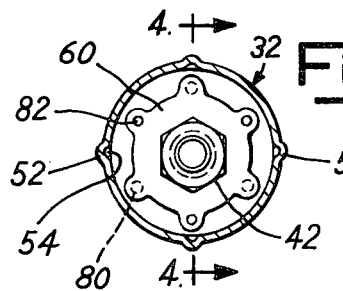
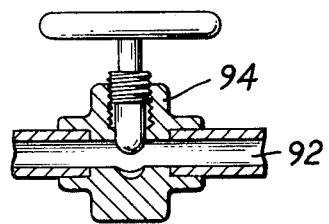
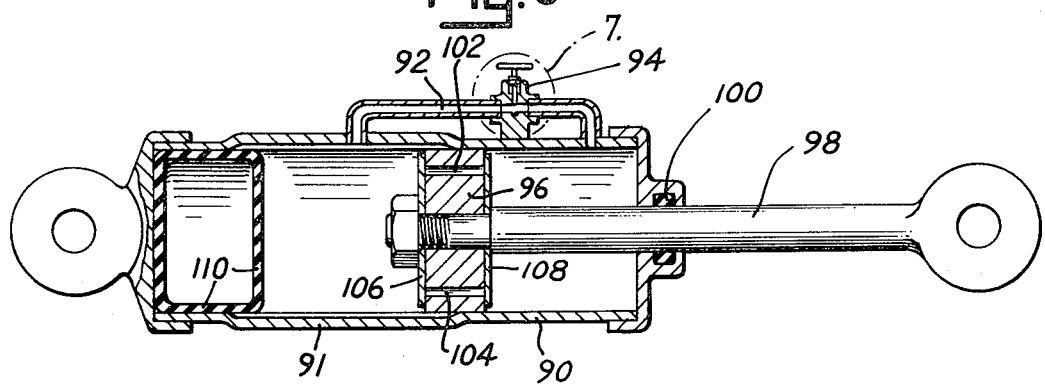

HYDRAULIC STABILIZING DEVICE

This is a division of application Ser. No. 861,972, filed Sept. 29, 1969 and now abandoned.

This invention relates to hydraulic stabilizing devices, and particularly to sway controls for trailers or towed vehicles.

The connection of mobile homes, travel trailers and other vehicles to a towing vehicle by means of a hitch or coupler which permits pivotal movement of the vehicles relative to each other for the purpose of turning a corner is a common practice. Various types of hitches have been designed, and commonly they entail the mounting of a coupler or socket member on the trailing vehicle. The coupler member fits around the hitch ball in a manner to permit relative lateral swinging of the two vehicles and also relative lateral rocking of the two vehicles as required to permit the two vehicles to travel in any selected path over uneven roadways or travel surfaces.

The flexibility of the connection provided by the hitch is necessary for vehicle operation, but introduces certain problems during travel. Thus, under some operating conditions, as incident to making a turn, or to travel in high winds, or to being passed by another vehicle on the road, or to travel upon wet or icy pavements, undesirable and dangerous sidewise swaying of the trailer may occur. This may lead to loss of control of the vehicle, to jackknifing, or to other serious conditions hazardous to the occupants of the tractor-trailer vehicle and to occupants of other vehicles upon the road.

Various efforts have been made to limit or prevent undesirable side sway and one device which accomplishes that purpose is illustrated in my U.S. Pat. No. 3,194,584, dated July 13, 1965, which illustrates a load-transferring hitch, that is a hitch in which some of the weight of the trailer is transferred to the chassis of the tractive vehicle. Various efforts have been made to provide sway control for tractor-trailer combinations in which no substantial amount of load transfer occurs between the trailer and the tractor chassis, but I am not aware of any prior device which is practical and completely effective for this purpose.

It is the primary object of this invention to provide a novel device which is usable with a hitch or coupler connecting a tractor and a trailing vehicle and which is operative to normally maintain the trailer in true aligned following position relative to the tractor and to resist or retard deviation of the trailer from a true aligned following position during travel without requiring the application of weight by the trailer at the coupler.

A further object is to provide a device of this character utilizing an extensible and contractible hydraulic cylinder and piston stabilizer unit having less hydraulic resistance to movement of the piston in one portion of a cylinder and greater resistance to movement of the piston in another portion of the cylinder.

A further object is to provide a stablilizing member comprising a hydraulic cylinder and piston wherein pneumatic means are utilized to compensate for changes in volume of the liquid-receiving space within the cylinder incident to movement of the piston and piston rod.

Other objects will be apparent from the following specifications:

In the drawings:

FIG. 1 is a top plan view of the device illustrating the association thereof with tractive and trailing vehicles connected by a coupler.

FIG. 2 is a longitudinal sectional view of a hydraulic member utilized in the device, which section is taken on line 2—2 of FIG. 3.

FIG. 3 is a transverse sectional view taken on line 3—3 of FIG. 2.

FIG. 4 is a longitudinal sectional view illustrating a modified embodiment of hydraulic member taken on line 4—4 of FIG. 5.

FIG. 5 is a transverse sectional view taken on line 5—5 of FIG. 4.

FIG. 6 is an axial sectional view of another type of hydraulic member forming another embodiment of the invention.

FIG. 7 is a sectional detail view of a flow restriction used in the FIG. 6 device.

Referring to the drawings, and particularly to FIGS. 1, 2 and 3 which illustrate one embodiment of the invention, numeral 10 designates a tractive vehicle to which is secured a suitable hitch ball support 12 carrying the usual hitch ball 14. The support 12 is preferably secured to the chassis of the tractive vehicle and includes a pair of laterally projecting parts 16, which extend oppositely on the support in symmetrical relation to the longitudinal center line of the hitch ball support 12 and vehicle 10. A trailing vehicle 18, such as mobile home or travel trailer or any other type of trailer, is preferably provided with a rigid forwardly projecting front frame portion 20 which mounts a conventional socket-type hitch or coupler member 22 adapted to be releasably interlocked with the hitch ball 14 to provide a towing connection between the tractive and trailing vehicles of a nature to provide a substantially universal or ball and socket joint interconnection accommodating turning and rocking of the two vehicles relative to one another.

A pair of similar extensible and contractible stabilizer members or units 30 interconnect the tractive and trailing vehicles, being arranged symmetrically relative to the longitudinal center line through the two vehicles when the vehicles are aligned. Each stabilizer unit includes a cylinder 32 having a connector 34 at one end thereof for pivotal or universal connection at 36 with one of the two vehicles, as at bracket 38 secured to the front projecting part of the trailer frame. Within the cylinder is slidable a piston 40. A piston rod 42 carried by the piston projects from one end of the cylinder and terminates in an end connector 44, which is connected for universal movement at 46 to the other vehicle. This connection is here shown as at an end portion of one of the laterally projecting parts 16 of the hitch ball support. The connections 46 of the stabilizer units are laterally spaced relative to the hitch ball 14 in similar, but opposite manner, and the connections 36 of the stabilizing unit with the trailer part 20 are also laterally spaced and arranged similarly, but in opposite relation to the hitch ball receiving socket of the hitch member 22. The stabilizer members or units 30 are similar in dimensions and construction.

The cylinder 32 of each stabilizer member is preferably of the construction illustrated in FIGS. 2 and 3, being characterized by one closed end portion 50 of true cylindrical shape and of a length approximately one-half of the total length of the cylinder. The opposite end portion of the cylinder preferably deviates from true cylindrical shape, and in the form shown its cylindrical shape is interrupted by one or more longitudinally extending offset portions 52 each of which defines an interior longitudinal channel 54. Where multiple channels 54 are provided, they are circumferentially spaced and preferably terminate at the same longitudinal position near the mid part of the cylinder. The portions of the cylinder between the offsets 52 are preferably of concentric part cylindrical configuration for engagement with the piston 40. It will be understood that the configuration illustrated shows one permissible construction of the cylinder and that any other structures which will provide one or more passages for free flow of liquid past the piston 40 may be utilized. The end of the cylinder 32 opposite the connector end 34 preferably includes a sleeve portion 56 in which the piston rod 42 has a snug sliding fit. The sleeve portion 56 is preferably provided with an internal circumferential groove mounting an O-ring or other resilient sealing ring 58 or with other means providing an effective seal against leakage of liquid around the piston rod 42 during the operation of the device, and the cylinder is sealed throughout against leakage.

The piston 40 preferably constitutes a circular body having a snug sliding fit in cylinder 30. The piston body mounts a pair of spring discs 60 and 61 in yielding engagement with the opposite end faces thereof. In the form shown, the piston 40 has a plurality of passages 62 and one or more passages 64 extending therethrough. Each of the discs 60 and 61 has apertures 66 therein registering with the piston passages 64. These registering apertures and passages 64, 66 are of restricted size to permit liquid flow through the pistons at a selected restricted rate. It will be understood that passages 64 may be omitted if desired. The left disc 60 as viewed in FIG. 2 has apertures 68 therein registering with a selected number of or some of the piston apertures 62, such as the upper aperture in FIG. 2. The other piston apertures 62 are spanned by the disc 60. The right-hand disc 61, as viewed in FIG. 2, preferably spans or closes some or all of the piston passages 62. As here chosen for illustration, and as seen in FIG. 3, the right-hand disc 61 has some apertures 70 communicating with piston passages 62 different from the passages with which apertures 68 of disc 60 register, and the disc 61 spans the ends of the remaining piston passages 62.

The arrangement is such that the hydraulic resistance to movement of the piston 40 in the cylinder may differ according to the direction of movement of the piston from a normal substantially centered position as shown in FIG. 2. Thus, preferably greater resistance to movement of the piston within the end portion 50 of the cylinder toward the left, as viewed in FIG. 2, is encountered than is true with respect to movement of the piston in portion 50 in the opposite direction. This differential resistance can be provided by having the right spring disc 61 arranged to close a lesser number of the piston passages 62 than are closed by disc 60, or it can be accomplished by differences in size of the piston passages 62 which are closed by the opposite spring discs, i.e., by having passages 62 which are closed by the right disc 61 be of smaller diameter than the passages 62 closed by the left disc 60, or it can be accomplished by using a stiffer disc 61 at the right-hand side of the piston, as shown, than the disc 60 at the left side.

An annular hollow gas-filled resilient bladder 72 may be threaded or slid over the piston rod 42 prior to the assembly of the piston 40 on the rod and its retention by lock nut 78. The cylinder 32 contains a quantity of liquid sufficient, when the piston 40 is located at its normal usage position, that is in the position it occupies when the trailing vehicle is aligned with the tractive vehicle, to fill all space in the cylinder except the space occupied by the extended bladder 72, when the gas in the bladder is at selected pressure, usually at or near atmospheric pressure.

In the operation of the device, whenever the tractive vehicle makes a turn the stabilizer located at the outside of the turn will be extended and the stabilizer located at the inside of the turn will be contracted or shortened relative to a normal position substantially as shown in FIG. 2. Both extension and contraction of the stabilizer entail movement of the piston 40 lengthwise within the cylinder. The device is so designed for intended use that maximum extension will occur at a position of the piston spaced from bladder 72. Extension of the device will entail less resistance by the liquid to piston movement than is experienced during contraction of the device by reason of the provision of the bypasses 54 of the cylinder and the construction of the piston 40 and discs 60, 61 as explained above. Of special importance, however, when the piston is moved while completely within the portion of the cylinder having the longitudinal bypasses or channels 54, resistance to piston movement in both directions is small.

It will be apparent that as the piston moves toward the right from a neutral or normal position, as viewed in FIG. 2, the volume of the fluid-accommodating space within the cylinder increases because of the reduction of the length of the portion of the piston rod 42 which is within the cylinder. Thus, as liquid flows from right to left, as seen in FIG. 2, incident to movement of the piston from left to right, the total fluid-accommodating volume within the cylinder increases by reason of the shortening of the length of the portion of the piston rod located within the cylinder. This increase in cylinder volume is compensated by expansion of the gas-filled bladder 72. Thus, there is assurance that the space or volume within the cylinder of each stabilizer is filled with liquid at all times. Stated differently, the bladder provides means for ensuring that the volume within the cylinder for the reception of liquid will remain constant despite movement of the piston in the cylinder, so that no voids will exist within the liquid-containing portion of the cylinder which might produce a foaming of the liquid or produce a suction, cushioning or other condition preventing proper or efficient functioning of the device.

The contraction of the stabilizer at the inside of a turn from the normal position shown in FIG. 2 generates liquid resistance to piston movement which serves to resist the turn of the vehicles.

No substantial resistance to return of the piston of an extended stabilizer to neutral or normal position is encountered until a predetermined position in the cylinder is reached, which may be at neutral position or preferably slightly before the piston reaches neutral position. This can be determined by the location of the bypass passages 54 longitudinally in the cylinder. It may be desirable in order to facilitate sway control that the left ends of these passages be located as seen in FIG. 2 so that the piston extends slightly therebeyond and into cylinder part 50 in the neutral or straight travel position of the stabilizer units 30 whereby resistance to movement of a piston from extended condition toward neutral position increases just before neutral position is reached. Such an arrangement tends to avoid undesirable overcorrection or overtravel of the stabilizer, and tends to retard or resist side sway of the trailing vehicle. It will be obvious that the use of two stabilizers 30 arranged at opposite sides of the center axis of the trailing vehicle will cause one stabilizer to be extended and the other contracted. Thus, the unit which is being contracted acts to resist turn or sway as soon as piston 40 starts travel in end part 50 of the cylinder.

In some instances a stabilizer of the construction illustrated in FIG. 2 may not be feasible. One such instance may occur where so called surge brakes (not shown) are carried by or effect operation of the trailer, as is commonly true with small trailers. Surge brakes operate in response to shortening of the spacing or distance between the tractive and trailing vehicles and require the use of a coupler which will accommodate slight relative movement of the trailer and tractor to vary this spacing. In such cases, the application of the brakes of the towing vehicle causes a shortening of the space between the two vehicles and the longitudinal movement of the trailing vehicle relative to the towing vehicle which operates a hydraulic mechanism (not shown) which tends to apply the surge brakes of the trailer. A device of the character illustrated in FIG. 2 would tend to prevent the shortening of the space between a trailer and a tractor and thereby prevent the surge required to operate the trailer surge brakes as explained above. In such applications or installations a stabilizer of the character illustrated in FIGS. 4 and 5 may be utilized.

The construction shown in FIGS. 4 and 5 utilizes a cylinder of substantially the same construction or character as that in FIG. 2, and the parts of the FIG. 4 construction which are similar to the parts of the FIG. 2 construction bear the same reference numerals. The cylinder has the interior bypass channels 54 extending for that part of the length thereof opposite that within which piston rod 42 extends while in normal position. The piston 40 may have large apertures 80 formed therein and apertures 82 registering with selected apertures 80 are formed in the left spring disc 60. These piston apertures 80 are spanned and normally closed by the right spring disc 61 which may have one or more apertures (not shown) registering with other apertures 80 closed by the left disc 60. It will be understood that this arrangement is optional, and that all piston passages may extend through the piston 40 and register with apertures in both of the spring discs, but in this event all of the apertures will preferably be of restricted size.

The arrangement will be such that movement of the piston 40 into the right part 50 of the cylinder relative to normal or intermediate position as viewed in FIG. 4, will entail greater resistance than movement of the piston 40 in the left part 54 of the cylinder relative to neutral position. Reduction of resistance to movement to the left from neutral or straight travel position occurs through the flow of liquid through the channels 54 and those passages 80 with which disc apertures 82 register.

A hollow sealed bladder 84 formed of resilient material is positioned in the left-hand end of part 55 of the cylinder and contains gas at substantially atmospheric pressure when the piston 40 is in neutral or straight travel position.

In the operation of this device, a difference in the hydraulic resistance of the two units arranged as shown in FIG. 1 occurs whenever a turn is made, as explained relative to the FIG. 2 construction. Also, as the piston moves to the left from straight travel position substantially as seen in FIG. 4, to increase the portion of the volume in the cylinder which is occupied by the piston rod 42, the bladder 84 will be reduced in volume by liquid pressure to the extent required to maintain constant the volume of the liquid containing portion of the cylinder. Also, it will be apparent that this construction permits both of the two stabilizers used in an arrangement as shown in FIG. 1 to be simultaneously shortened by overrunning straight travel action of the trailer incident to the application of the brakes of the tractor, which action is accommodated by the equal and simultaneous movement of both pistons in cylinder part 34 and by change reduction of the volumes of the bladders of the two stabilizers. Consequently, the necessary relative movement of the tractor and trailer to produce operation of surge brakes can occur.

Another embodiment of the invention is illustrated in FIG. 6 wherein a cylinder 90, which may have a channel 91 at a selected part of its length, has a bypass conduit 92 whose opposite ends communicate with the cylinder. One end of the bypass, as at the right, communicates with the cylinder adjacent to the end of the cylinder and the opposite end of the bypass may communicate with the cylinder at an intermediate position. A valve 94 is interposed in the bypass conduit 92 and serves to regulate the rate at which liquid may flow through the bypass.

A piston 96 has piston rod 98 which passes through an opening at one end of the cylinder which carries an annular resilient sealing member, such as an O-ring 100. Piston 96 has a plurality of passages therethrough including passages 102 and 104 which may be of different cross-sectional sizes. The piston unit includes a left spring disc 106 having one or more apertures therein which communicate with the passages 102 and having portions which span and close normally the passages 104. A second spring disc 108 is carried by the piston 96 at the right side thereof and has one or more passages therein registering with the passages 104 and portions which normally close and seal the passages 102.

In the normal or straight travel position of the stabilizer units the piston 96 is positioned substantially centrally or at an intermediate position in the cylinder 90 between the opposite ends of the bypass 102. A resilient sealed bladder 110 is positioned in the left-hand end of the cylinder 90 as viewed and contains gas at or slightly above atmospheric pressure and occupies all of the space in the cylinder which is not occupied by liquid in the cylinder when the piston is at the normal straight travel position.

The operation of the FIG. 6 device is the same as that of the FIG. 4 device, it being understood that movement of the piston from neutral straight travel position to the right or the left-hand end of the bypass conduit 92 occurs with selected resistance determined by the size of passages 102 and 104, the resistance of spring discs 106 and 108 and the setting of valve 94, and is accompanied by increase in the volume of the bladder 110 as required to compensate for change in the volume of the portion of the cylinder which is occupied by the piston rod 98. Movement of the piston from normal position toward the bladder occurs with less resistance than toward the right, as accommodated by the channel 91, until the piston passes the left end of the bypass 92. Also, movement of the pistons of both stabilizers from neutral position and toward the bladders to shorten the stabilizers permits operation of surge brakes.

One interesting characteristic of the device of FIGS. 4 and 6 when used with a trailer equipped with surge brakes is that the stabilizers accommodate shortening thereof but resist lengthening thereof during straight travel. However, if a violent lateral sway of the trailer is caused by any condition, the stabilizer which tends to elongate as a result of the sway will resist such elongation while the other stabilizer is free to shorten, and, in a proper correlation or design, such actions of the two stabilizers may be sufficient to cause energization of the surge brakes of the trailer, thereby bringing such surge brakes into play in cooperation with the operation of the stabilizing means to tend to restore the tractor-trailer vehicle to straight travel without effort by the driver.

While the device herein illustrated is primarily intended for use as a sway control for trailers, it will be understood that the components, such as the devices illustrated in FIGS. 2, 4 and 6, may be used for other purposes. One such purpose is as a vehicle-snubbing device, such as a vehicle shock absorber. In such instances, the provision of the flexible expansible and contractible bladder in the construction eliminates the need for liquid reservoir compartments now commonly provided in such shock absorbers.

While the preferred embodiments of the invention have been illustrated and described, it will be understood that changes in the construction may be made without departing from the spirit of the invention.

What I claim is:

1. In combination, a tractive vehicle, a trailing vehicle, coupling means pivotally connecting said vehicles for relative turning thereof about a pivot center, and a pair of extensible and contractible hydraulic stabilizing members connected to said vehicles at opposite sides of and in normally symmetrical and spaced relation to said pivot center whereby one member is extended and the other member is contracted when said vehicles turn relative to each other on said pivot center, each stabilizing member sway-controlling device of the type having a liquid containing cylinder, an apertured piston and a piston rod projecting from said piston and having a sealed sliding fit in one end of said cylinder, said device defining a closed chamber whose volume varies as said piston and piston rod move in said cylinder, a sealed, flexible, resilient, hollow bladder within said cylinder containing a gas and free to expand and compress responsive to movement of said piston and piston rod whereby to compensate for variation of said chamber volume, and bypass means carried by said cylinder at an end portion thereof to reduce the resistance of said liquid to movement of said piston within a predetermined range at the end of its stroke adjacent said bypass as compared to the resistance of said liquid to movement of said piston while at least a portion of said piston is within the portion of the cylinder spaced longitudinally from said bypass means, said piston being located with a portion only thereof juxtaposed to said bypass during normal straight vehicle travel. Normal straight travel condition.

2. The combination of claim 1, wherein the quantity of liquid contained in said cylinder has a volume less than required to fill said chamber in the minimum-volume position of the piston, and wherein said bladder and liquid cooperate to fill said chamber in all positions of said piston.

3. The combination of claim 1, wherein said bladder is annular and encircles said piston rod.

4. The combination defined in claim 1, wherein said piston centrally mounts spring discs at opposite faces and each having at least one aperture registering with a piston aperture and each spanning at least one piston aperture, each piston aperture being open at one of its ends.

5. The combination defined in claim 4, wherein one spring disc has greater resistance to deflection than the other.

* * * * *